United States Patent [19]

Taniguchi et al.

[11] Patent Number: 5,479,499
[45] Date of Patent: Dec. 26, 1995

[54] SENSOR CIRCUIT FOR VOICE/FAX SWITCH WITH CASCADED AMPLIFIER CIRCUIT

[75] Inventors: Katsumi Taniguchi; Hiroyuki Ohta; Shigeru Arai, all of Nagaokakyo, Japan

[73] Assignee: Murata Manufacturing Co., Ltd., Japan

[21] Appl. No.: 167,331

[22] Filed: Dec. 15, 1993

[51] Int. Cl.⁶ .................................................. H04M 1/00
[52] U.S. Cl. ........................... 379/351; 379/372; 379/378
[58] Field of Search ........................... 379/377, 378, 379/386, 387, 389, 395, 401, 97, 372, 350, 351, 390; 330/6, 149

[56] References Cited

U.S. PATENT DOCUMENTS

| | | | |
|---|---|---|---|
| 3,962,534 | 6/1976 | Ogawa | 379/377 |
| 4,022,980 | 5/1977 | Kitajewski et al. | 379/378 |
| 4,506,113 | 3/1985 | Blomley | 379/347 |
| 4,924,191 | 3/1990 | Erb et al. | 330/130 |
| 5,311,587 | 5/1994 | Ohta et al. | 379/377 |
| 5,361,039 | 11/1994 | Michel | 330/149 |

OTHER PUBLICATIONS

"Practical Analysis of Amplifier Circuits Through Experimentation", Lorne MacDonald, 1981 pp. 260–262.

*Primary Examiner*—Jeffery A. Hofsass
*Assistant Examiner*—Scott L. Weaver
*Attorney, Agent, or Firm*—Ostrolenk, Faber, Gerb & Soffen

[57] ABSTRACT

A sensor circuit for telephone line includes a line current detecting circuit (52, 54) which generates a detection signal in response to a line current flowing in a telephone line (20, 22). The detection signal is applied to a first amplifier (56), and the detection signal as amplified is not only further amplified by a second amplifier (57) but also applied to a tone deriving circuit (60) and a CI detecting circuit (61) via a coupling capacitor (59). The detection signal as amplified twice is applied to a comparing circuit (58) which compares the detection signal from the second amplifier with a first reference voltage (V1) and a second reference voltage (V2), so that a line current supervisory signal is outputted from the comparing circuit. The tone deriving circuit includes a band-pass filter and derives a tone signal from the detection signal from the first amplifier. The CI detecting circuit detects a CI (calling tone) on the basis of the detection signal from the first amplifier.

8 Claims, 5 Drawing Sheets

5,479,499

SENSOR CIRCUIT FOR VOICE/FAX SWITCH WITH CASCADED AMPLIFIER CIRCUIT

BACKGROUND OF THE INVENTION

1. Field of the Invention

The present invention relates to a sensor circuit for telephone line. More specifically, the present invention relates to a sensor circuit for telephone line which is provided in a network control unit (NCU).

2. Description of the Prior Art

A circuit diagram of a conventional example of an NCU is shown in FIG. 7. The NCU 10 includes terminals 12 and 14 respectively connected to an intra-office switch (not shown). Relay switches 16 and 18 have movable contacts 16a and 18a and individual contacts 16b and 16c and 18b and 18c, respectively. The movable contact 16a is connected to the terminal 12 via a telephone line 20, and the movable contact 18a is connected to the terminal 14 via a telephone line 22 in which a line current supervisor circuit 24 is inserted. The individual contacts 16b and 18b are connected to both ends of a primary winding 26a of a line transformer 26, respectively. The line transformer 26 includes a secondary winding 26b.

In addition, the individual contacts 16c and 18c are connected to a tone detection circuit 28 which is composed of a capacitor 30 and a line transformer 32. The line transformer 32 includes a primary winding 32a and a secondary winding 32b coupled to the primary winding 32a.

The secondary winding 26b of the line transformer 26 is connected to a two-line/four-line (2 W/4 W) conversion circuit 34 which converts two lines of the telephone line into four lines which are connected to a signal processing circuit 36 incorporated in another electric equipment, for example, a facsimile. The secondary winding 32b of the line transformer 32 is also connected to the signal processing circuit 36 in the facsimile.

The signal processing circuit 36 determines whether an electrical signal flows in the telephone lines 20 and 22 is a signal for a telephone set (not shown) connected to terminals 38 and 40 for a signal for the facsimile. When it is determined that the electrical signal is for the telephone set, the signal processing circuit 36 controls the relay switches 16 and 18 so as to connect the movable contact 16a and 18a to the individual contacts 16c and 18c, respectively and, when it is determined that the electrical signal is for the facsimile, the movable contacts 16a and 18a are connected to the individual contacts 16b and 18b, respectively by the signal processing circuit 36.

The line current supervisor circuit 24 is inserted in the telephone line 22, as described above. The line current supervisor circuit 24 includes a pair of photocouplers 42 and 44 one of which is composed of a light emitting element 42a which emits a light signal when the line current flows in an arrow mark A direction and a light receiving element 42b which receives the light signal emitted by the light emitting element 42a, and the other is composed of a light emitting element 44a which emits a light signal when the line current flows in an arrow mark B direction and a light receiving element 44b which receives the light signal emitted from the light emitting element 44a. Outputs of the light receiving elements 42b and 44b are withdrawn at terminals 46 and 48, respectively, and the terminals 46 and 48 are connected to a detection circuit (not shown) for detecting an on state or an off state of a hook switch (not shown) of the telephone set and the signal processing circuit 36.

Then, if the hook switch is turned-off by releasing a hand set of the telephone set, the line current flows in the arrow mark A direction, and therefore, the light emitting element 42a emits a light signal which is then received by the light receiving element 42b. Therefore, an output signal is applied to the signal processing circuit 36 via the terminal 46. On the other hand, if the line current flows in the arrow mark B direction, the light emitting element 44a emits a light signal which is then received by the light receiving element 44b, and therefore, an output signal is applied to the signal processing circuit 36 via the terminal 48.

As described above, the conventional example of the NCU shown in FIG. 7 includes the line current supervisor circuit 24 and the tone detection circuit 28 separately. The tone detection circuit 28 includes the line transformer 32 which is large and high in cost thereof, and the line current supervisor circuit 24 is constructed by the photocouplers 42 and 44, as described above. Therefore, if the line current supervisor circuit 24 and the tone detection circuit 28 are individually mounted on a circuit board, a substantially large space is required for mounting these circuits, and therefore, the NCU itself becomes large and the cost thereof also becomes high.

Therefore, the same assignee or applicant has proposed a new sensor circuit for telephone line in the co-pending U.S. application No. 08/068,590 and U.S. application No. 07/898,086, now U.S. Pat. No. 5,311,587 or German application Nos. P42 19 356.7 and P42 21 306.1. The proposed sensor circuit utilizes a detection coil inserted in the telephone line and a magnetic sensor such as a Hall element magnetically coupled to the detection coil. The detection coil generates a magnetic flux according to a magnitude and a polarity of a line current, and therefore, the magnetic sensor generates a voltage signal corresponding to the magnetic flux, i.e. the line current. Therefore, it is not required to use the photo-couplers and the line transformer.

However, in the proposed sensor circuit, it was difficult to derive the tone signal with accuracy due to a distortion of the tone signal superposed on the voltage signal.

SUMMARY OF THE INVENTION

Therefore, a principal object of the present invention is to provide a novel sensor circuit for telephone line.

Another object of the present invention is to provide a sensor circuit for telephone line which requires only a small mounting space.

Another object of the present invention is to provide a sensor circuit for telephone line with a low cost.

Another object of the present invention is to provide a sensor circuit for telephone line capable of deriving a tone signal with accuracy.

In brief, a sensor circuit for telephone line according to the present invention comprises line current detecting means for detecting a line current which flows in a telephone line and for generating a detection signal in response to the line current; first amplifying means for amplifying the detection signal generated by the line current detecting means; second amplifying means for amplifying the detection signal amplified by the first amplifier; line current supervisor means for outputting a supervisory output of the line current on the basis of the detection signal outputted by the second amplifier; and tone deriving means for deriving a tone signal from the detection signal outputted by the first amplifier.

The line current detecting means includes, for example, a detection coil inserted in the telephone line and a magnetic sensor such as a Hall element magnetically coupled to the detection coil. Therefore, the magnetic sensor, that is, the line current detecting means outputs a detection signal according to the line current flowing in the telephone line. The detection signal outputted from the line current detecting means is amplified by the first amplifier and the second amplifier, and the detection signal outputted from the second amplifier is applied to the line current supervisor means, and the detection signal outputted from the first amplifier is applied to the tone deriving means, respectively.

According to the present invention, since the line current supervisor means outputs the supervisory signal of the line current on the basis of the detection signal from the line current detecting means and the tone deriving means derives the tone signal from the same detection signal from the line current detecting means, and therefore, it is possible to reduce the number of components for a sensor circuit for telephone line. Accordingly, it is possible to obtain an NCU with a small space and a low cost.

In addition, according to the present invention, the detection signal is amplified twice by the first amplifying means and the second amplifying means, and therefore, even if a change of the detection signal outputted by the line current detecting means is small, a change of the detection signal amplified twice by the first and second amplifying means becomes large, and accordingly, it is possible to watch or supervise the line current with accuracy.

Furthermore, since the detection signal which is amplified by only the first amplifying means is applied to the tone deriving means, no distortion occurs in the tone signal superposed on the detection signal, and therefore, it becomes possible to surely derive the tone signal.

DETAILED DESCRIPTION OF THE PREFERRED EMBODIMENTS

Figure 1:
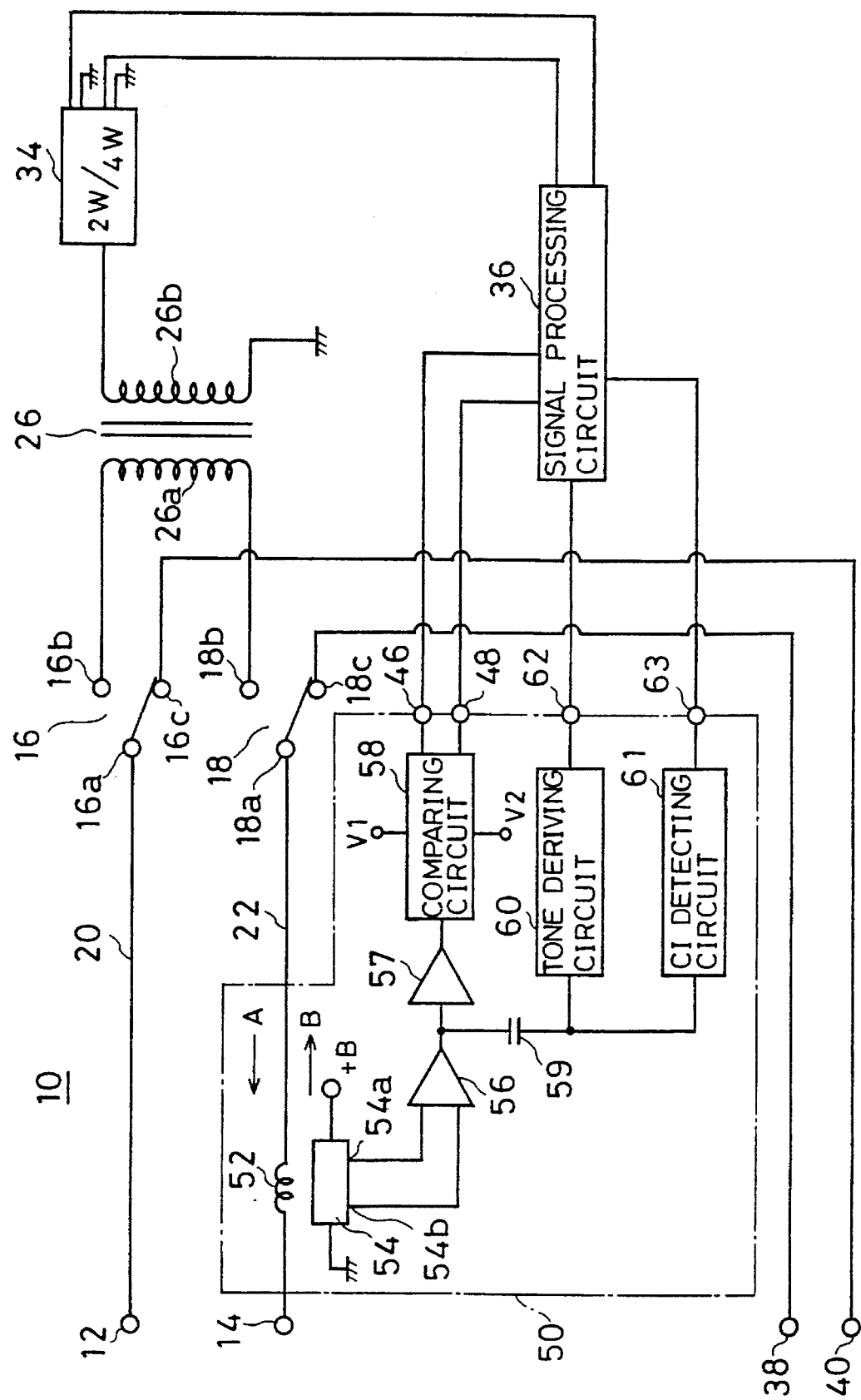
FIG. 1 is a circuit diagram showing one embodiment according to the present invention.
Figure 7:
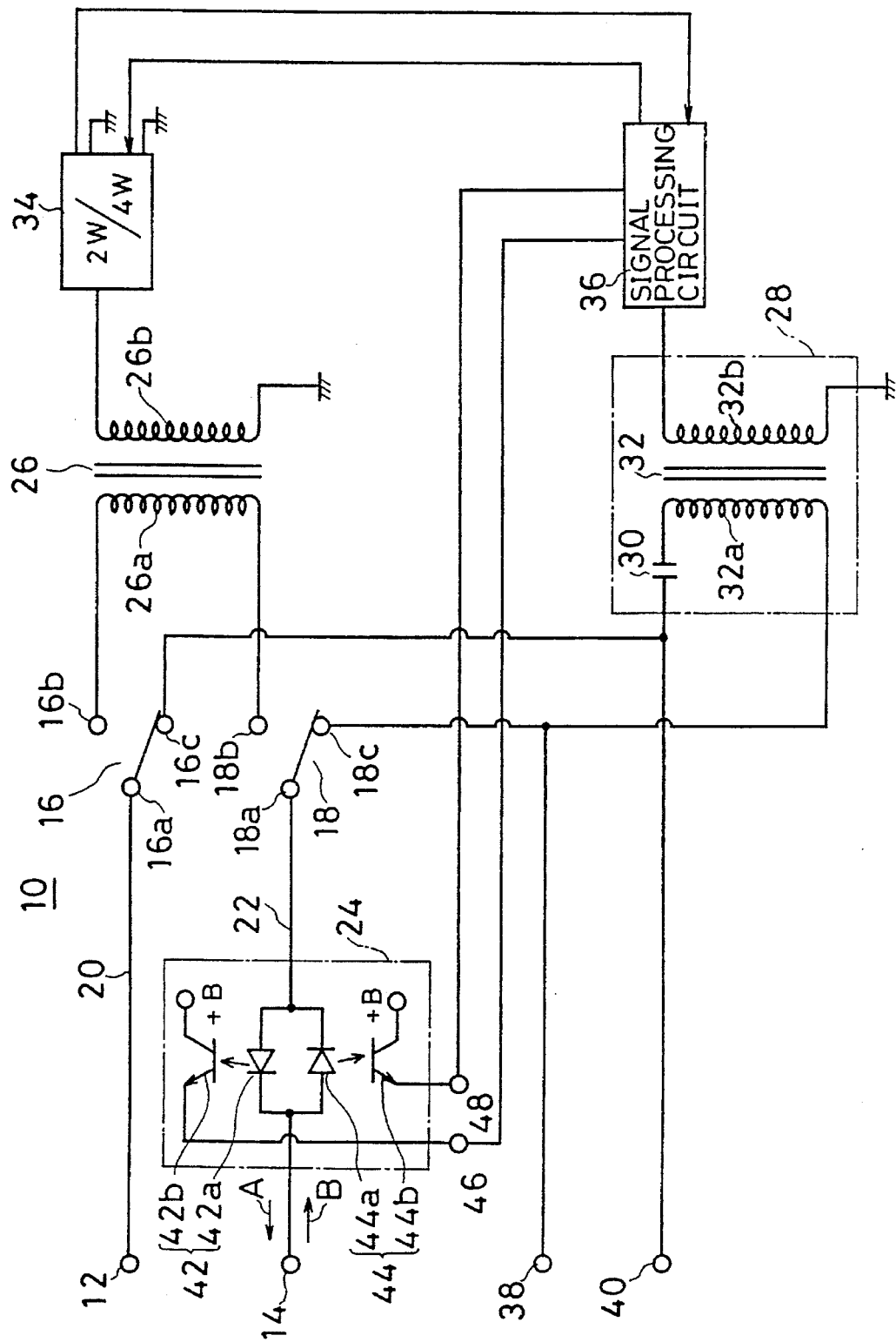
FIG. 7 is a circuit diagram showing one example of a conventional sensor circuit.

FIG. 1 is a circuit diagram showing one embodiment according to the present invention; however, the same reference numerals are used for designating the same components as that of FIG. 7, and therefore, a detailed description of these components will be omitted here.

A sensor unit 50 of this invention shown in FIG. 1 includes a detection coil 52 and a magnetic sensor 54 which constitutes a line current detecting means; a first amplifier 56; a second amplifier 57; a comparing circuit 58 which constitutes a line current supervisory means; a tone deriving circuit 60; and a calling tone (CI) detecting circuit 61. These components are incorporated in a single unit 50.

The detection coil 52 generates a magnetic signal (magnetic flux) according to a flowing direction of the line current indicated by an arrow mark A or B. The magnetic sensor 54 includes a Hall element, for example, and detects the magnetic signal generated by the detection coil 52 and outputs a voltage signal in response to the magnetic signal from output ends 54a and 54b. The first amplifier 56 is composed of a differential amplifier, for example, and amplifies the voltage signal from the output ends 54a and 54b.

Figure 2:
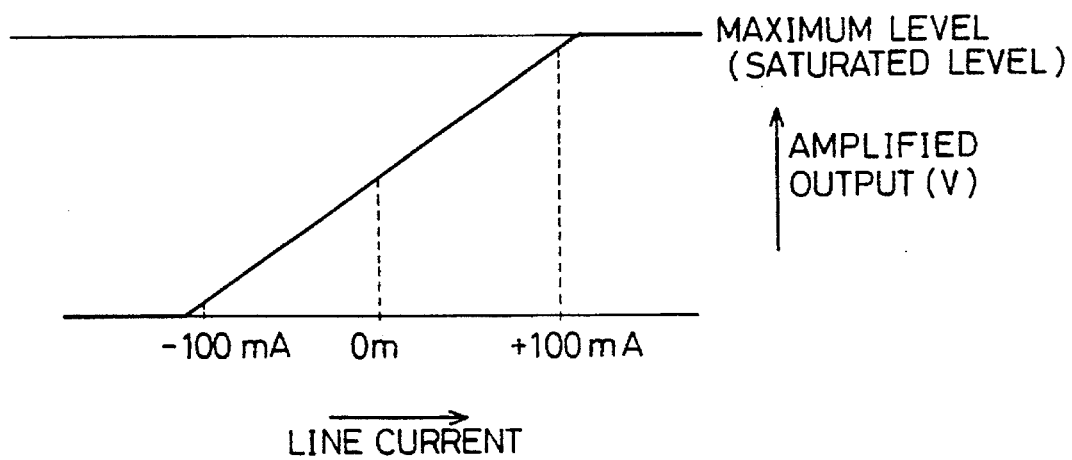
FIG. 2 is a graph showing an output characteristic of a first amplifier shown in FIG. 1.

An output characteristic of the first amplifier 56 is shown in FIG. 2 in which an abscissa indicates a line current and an ordinate indicates an amplified output. That is, the first amplifier 56 has an output characteristic wherein the output from the first amplifier 56 corresponding to a minimum value of the line current (−100 mA, for example) through a maximum value of the line current (+100 mA, for example) can be within a dynamic range of the first amplifier 56.

Figure 3:
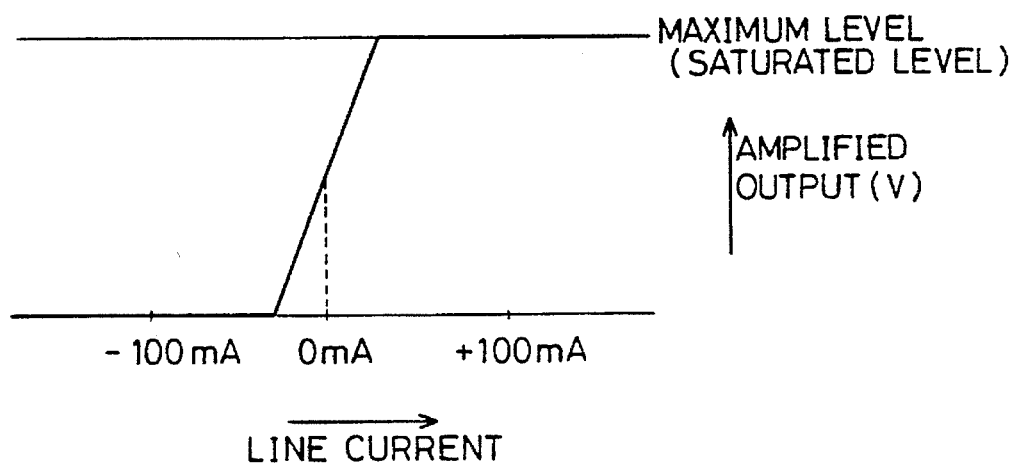
FIG. 3 is a graph showing an output characteristic of a second amplifier shown in FIG. 1.

The output signal from the first amplifier 56, i.e. an amplified detection signal is further amplified by a second amplifier 57. An output characteristic of the second amplifier 57 is shown in FIG. 3 in which an abscissa indicates a line current and an ordinate indicates an amplified output. That is, the second amplifier 57 has an output characteristic wherein a ratio of a changing amount of an amplified output from the second amplifier 57 with respect to a changing amount of the line current becomes larger than a ratio of a changing amount of an amplified output from the first amplifier 56 with respect to the line current.

The output signal of the first amplifier 56 is further applied to the tone deriving circuit 60 and the CI detecting circuit 61 via a capacitor 59 for cutting-off a direct current component.

In addition, it is to be noted that the output characteristic of the second amplifier 57 shown in FIG. 3 represents only a fact that a level of a signal outputted from the second amplifier 57 is larger than a level of a signal inputted thereto. Therefore, even if it is required to merely obtain a signal having a level the same as the output of the second amplifier 57, it is not necessary to use amplifiers of two stages and it can be satisfied by only a single-stage amplifier. However, if a signal having a level as same as the level of the output signal from the second amplifier 57 of this embodiment shown in FIG. 1 can be obtained by only a single-stage amplifier, it becomes impossible to make the amplified output corresponding to the line current which varies widely be within a dynamic range of the single-stage amplifier. Therefore, portions at sides of a minimum value and a maximum value of the line current are clipped or saturated due to a narrower dynamic range, and accordingly, distortion occurs in the tone signal superposed on the line current, and resultingly, it becomes impossible to surely derive the tone signal in the tone deriving circuit 60.

In contrast, in this embodiment shown in FIG. 1, since there are provided with at least two stages of amplifiers and the detection signal amplified only by the first amplifier 56 is applied to the tone deriving circuit 60, no distortion occurs in the tone signal.

Figure 4:
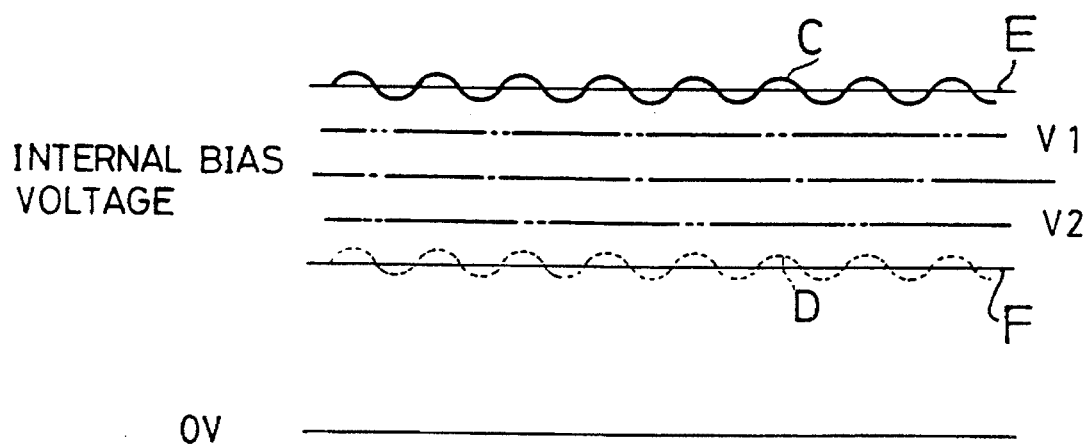
FIG. 4 is a waveform chart showing a voltage signal outputted from an amplifier shown in FIG. 1.

A voltage signal as amplified twice by the first and second amplifier 56 and 57 is shown in FIG. 4. In FIG. 4, a solid line C shows the voltage signal from the second amplifier 57 at a time when the line current flows in the telephone line 22 in a direction of one of the arrow marks A and B, and a dotted line D shows the voltage signal at a time when the line current flows in a direction of the other of the arrow marks A and B. In addition, FIG. 4 shows a state where a tone signal (alternating current component C or D) is superposed on a direct current component E or F. However, if no alternating current component is superposed, the voltage signal outputted from the second amplifier 57 includes only the direct current voltage E or F.

Figure 5:
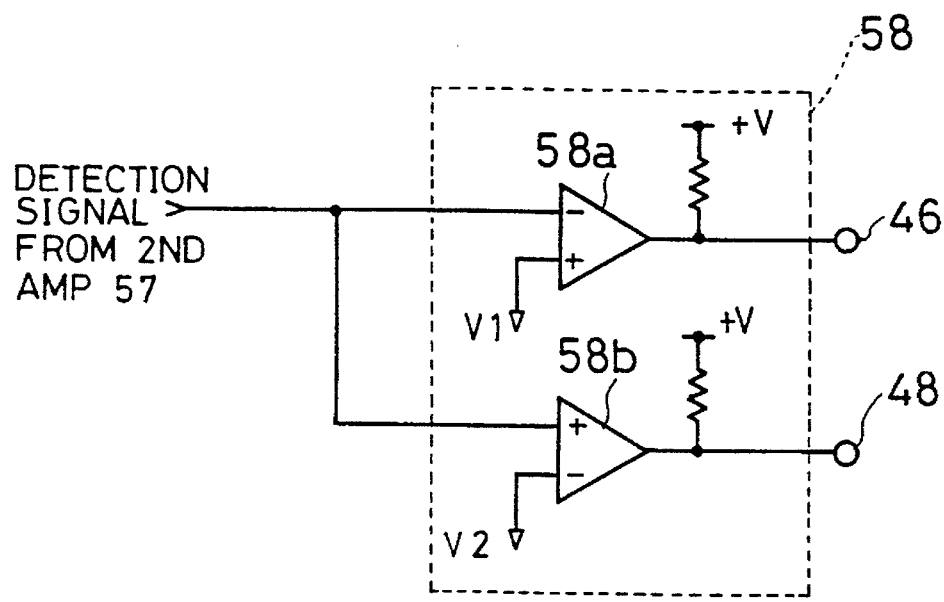
FIG. 5 is a circuit diagram showing a comparing circuit shown in FIG. 1.

The comparing circuit 58 includes two comparators 58a and 58b as shown in FIG. 5. The comparators 58a receives the voltage signal outputted from the second amplifier 57 at a (−) input and a reference voltage V1 at a (+) input. The comparator 58b receives the same voltage signal at a (+) input and a reference voltage V2 at a (−) input. Therefore, the voltage signal shown by the solid line C in FIG. 4 is compared with the reference voltage V1 which is also shown in FIG. 4 by a two-dotted line by the comparator 58a, and the comparator 58a outputs a low level signal when the voltage signal is larger than the reference voltage V1. On the other hand, the voltage signal shown by the dotted line D in FIG. 4 is compared with the reference voltage V2 which is also shown in FIG. 4 by a two-dotted line by the comparator 58b, and if the voltage signal is smaller than the reference signal V2, a low level signal is outputted from the comparator 58b. Thus, the low level signal is outputted from the comparator 58a when the line current of a predetermined magnitude flows in the arrow mark A or B direction, and the low level signal is outputted from the comparator 58b when the line current of a predetermined magnitude flows in the arrow mark B or A direction.

In addition, when the line current does not flow in the telephone line 22 or a magnitude of the line current is small and thus the voltage signal is smaller than the reference voltage V1, a high level signal is outputted from the comparator 58a. If the voltage signal is larger than the reference voltage V2, high level signals are outputted from the comparator 58b.

The above described signals are applied to the signal processing circuit 24 via terminals 46 and 48 as line current supervisory signals.

Figure 6:
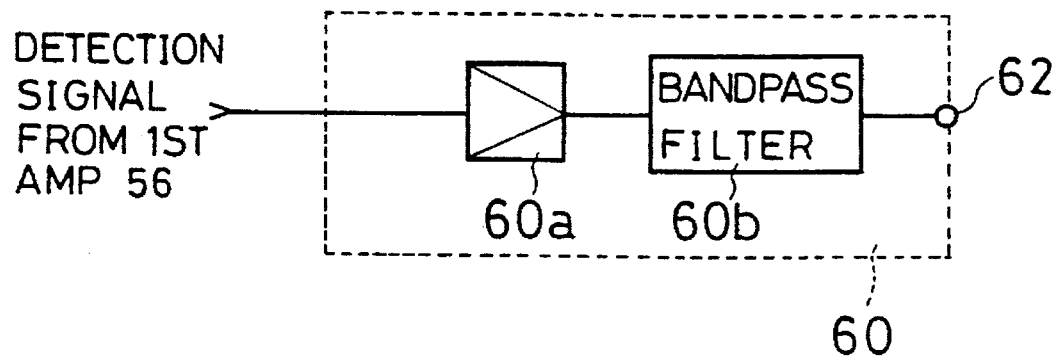
FIG. 6 is a circuit diagram showing a tone deriving circuits shown in FIG. 1.

As shown in FIG. 6, the tone deriving circuit 60 includes an amplifier 60a, and a band pass filter 60b having a pass-band of 400–1700 Hz, for example. Therefore, the direct current component included in the voltage signal outputted from the first amplifier 56 is removed by the capacitor 59, and only an alternating current component shown in FIG. 4 is amplified by the amplifier 60a and inputted to the band pass filter 60b. Therefore, if a tone signal of 1100 Hz, for example, a facsimile network signal notifying that a facsimile is to be used, is included in the voltage signal, the tone signal is outputted from the band pass filter 60b to be applied to the signal processing circuit 36 via a terminal 62.

If a frequency detector (not shown) is connected to the output of the tone deriving circuit 60, it is possible to determine a kind of the tone signal, that is, whether the derived tone signal is the facsimile network signal, or the like. In a practical circuit, such a frequency detector is inserted between the tone deriving circuit 60 and the signal processing circuit 36, i.e., the microcomputer, In addition, the CI detecting circuit 61 detects a calling tone (CI) on the basis of the output of the first amplifier 56. A signal which indicates whether the calling tone is included or not in the output of the first amplifier 56 is applied to the signal processing circuit 36 via a terminal 63.

Furthermore, the signal processing circuit 36 is composed of a microcomputer which mainly controls the relay switches 16 and 18 on the basis of the line current supervisory signal at the terminals 46 and 48, the tone signal at the terminal 62, and the CI signal at the terminal 63.

More specifically, if a telephone set is to be used, the line current flows through the telephone line 22 in the arrow mark A or B direction, and therefore, the low level signal is outputted from the comparator 58a or 58b, i.e., from the comparing circuit 58, and no tone signal is inputted from the terminal. Therefore, the microcomputer controls the relay switches 16 and 18 so that the movable contacts 16a and 18a can be connected to the individual contacts 16b and 18b, respectively.

If a facsimile is to be used, the line current flows in the arrow mark A or B direction, and therefore, the low level signal is outputted from the comparators 58a or 58b, respectively, and a tone signal is applied from the tone signal deriving circuit 60, that is, from the terminal 62. Accordingly, when the tone signal is inputted from the tone deriving circuit 60, the signal processing circuit 36, that is, the microcomputer controls the relay switches 16 and 18 so that the movable contacts 16a and 18a can be connected to the individual contacts 16c and 18c, respectively.

In addition, in the above described embodiment, the band-pass filter 60b is connected to the output of the amplifier 60a; however, a connection order of the amplifier 60a and band-pass filter 60b may be inverted. That is, the band-pass filter 60b may be connected to the input of the amplifier 60a so that the tone signal is outputted from the amplifier 60a to the terminal 62.

Furthermore, in the above described embodiment, the tone deriving circuit 60 is incorporated in the single unit 50 together with the comparing circuit 58; however, it is needless to say that the comparing circuit 58 and the tone deriving circuit 60 may be separated from each other. For example, a single unit may be formed by excepting the tone deriving circuit 60. In such a case the detection signal through the capacitor 59 which is incorporated in the unit 50 may be directly connected to the terminal 62 of the unit 50, and the tone deriving circuit 60 may be connected to the terminal 62.

In addition, the amplifier 60a is used in the above described embodiment, and therefore, by functionally trimming a resistance value of a resistor internally connected to an operational amplifier or the like in the amplifier 60a, it is possible to easily adjust or correct a fluctuation of the output voltage signal from the magnetic sensor 52.

Furthermore, the capacitor 59 for cutting-off a direct current component may be provided outside the unit 50. In such a case, the capacitor 59 and the tone deriving circuit 60 can be connected to the terminal at an outside of the unit 50. Then, in this case, the terminal 62 may be utilized for a purpose to measure a state of a signal outputted from the first amplifier 56.

In addition, the CI detecting circuit 61 also may be provided outside the unit 50. Furthermore, the calling tone (CI) may be detected on the basis of a signal other than the output of the first amplifier 56. In addition, the CI detecting circuit 61 may be deleted completely. If the CI detecting circuit is deleted, the CI can be detected by the aforementioned frequency detector inserted between the tone deriving circuit 60 and the signal processing circuit 36.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A sensor circuit for a telephone line, comprising;

line current detecting means for magnetically detecting a line current which flows in said telephone line to output a detection signal according to the line current;

first amplifying means for amplifying said detection signal from said line current detecting means, said first amplifying means having dynamic range wherein no saturation occurs in a signal outputted from said first amplifying means;

second amplifying means for amplifying the signal amplified by said first amplifying means, said second amplifying means having an output characteristic such that a ratio of a change in the signal amplified by said first amplifying means, after being amplified by said second amplifying means, to a corresponding change in the line current, is larger than a ratio of a change in the signal amplified by said first amplifying means, to a corresponding change in the line current;

supervisor means for outputting a line current supervisory signal based on the signal amplified by said second amplifying means; and tone deriving means for deriving a tone signal from the signal amplified by said first amplifying means.

2. A sensor circuit according to claim 1, wherein the line current detecting means includes magnetic signal generating means for generating a magnetic signal according to the line current, and magnetic signal detecting means for detecting the magnetic signal generated by the magnetic signal generating means to output a voltage signal as said detection signal.

3. A sensor circuit according to claim 2, wherein the magnetic signal generating means includes a detection coil means coupled to the telephone line.

4. A sensor circuit according to claim 3, wherein the magnetic signal detecting means includes a Hall element.

5. A sensor circuit according to claim 1, wherein the supervisor means includes comparing means for comparing the detection signal from the line current detecting means with at least one reference signal.

6. A sensor circuit according to claim 5, wherein the comparing means includes two comparators one of which compares the detection signal from the line current detecting means with a first reference signal and the other of which compares the detection signal with a second reference signal which is different in level from the first reference signal.

7. A sensor circuit according to claim 1, wherein the tone deriving means includes direct current component removing means for removing a direct current component from the detection signal from the line current detecting means, and filter means for filtering an output of the direct current removing means so as to derive the tone signal.

8. A sensor circuit according to claim 7, wherein the filter means includes a band-pass filter, and means for amplifying a signal inputted to or outputted from the band-pass filter.

* * * * *